United States Patent
Tsumiyama et al.

(10) Patent No.: US 9,511,701 B2
(45) Date of Patent: Dec. 6, 2016

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Keiji Takahashi, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 1 day.

(21) Appl. No.: 14/585,935

(22) Filed: Dec. 30, 2014

(65) Prior Publication Data

US 2016/0185271 A1 Jun. 30, 2016

(51) Int. Cl.
*B60P 1/28* (2006.01)
*B60R 9/06* (2006.01)
*B60R 11/06* (2006.01)

(52) U.S. Cl.
CPC .................. *B60P 1/28* (2013.01); *B60R 9/065* (2013.01); *B60R 11/06* (2013.01)

(58) Field of Classification Search
CPC .............. B60P 1/28; B60R 5/04; B60R 7/005; B60R 7/02; B60R 7/043; B60R 9/06; B60R 9/065; B60R 11/06; B60R 2011/0012; B60R 2011/0036; B60R 2011/0096; B62D 33/042
See application file for complete search history.

(56) References Cited

U.S. PATENT DOCUMENTS

| | | | | |
|---|---|---|---|---|
| 4,249,295 A * | 2/1981 | Lance | ..................... | B60R 11/06 29/416 |
| 5,498,049 A * | 3/1996 | Schlachter | .............. | B60R 11/06 224/404 |
| 5,628,442 A * | 5/1997 | Wayne | ..................... | B60R 7/005 224/42.33 |
| 6,065,794 A * | 5/2000 | Schlachter | ................ | B60R 5/04 296/37.16 |
| 6,290,277 B1 * | 9/2001 | Spykerman et al. | ..... | B60R 5/04 224/496 |
| 7,281,742 B2 * | 10/2007 | Porter, II | .................. | B60R 5/04 296/24.4 |
| 7,673,920 B2 * | 3/2010 | Nakamura et al. | ..... | B60R 11/00 224/274 |
| 7,950,486 B2 * | 5/2011 | Van Bronkhorst et al. | .................... | B60G 15/063 180/89.11 |
| 8,075,040 B2 * | 12/2011 | Arnold | ................. | B60N 2/3013 296/183.2 |
| 8,136,857 B2 * | 3/2012 | Shimizu | ............... | B60N 2/3011 296/26.09 |

(Continued)

FOREIGN PATENT DOCUMENTS

DE 102009058611 A1 * 6/2011 .............. B60J 7/223
DE 102012006525 A1 * 10/2013 .............. B60R 5/04
(Continued)

*Primary Examiner* — Glenn Dayoan
*Assistant Examiner* — Paul Chenevert
(74) *Attorney, Agent, or Firm* — Wenderoth, Lind & Ponack, L.L.P.

(57) ABSTRACT

A utility vehicle capable of providing a storage box without restricting the storage capacity of the cargo bed thereof. The utility vehicle includes one or a plurality of seat rows, a dumping-type cargo bed behind the seat row(s), and a storage box disposed in a space between a backrest of the seat row(s) and a front panel of the cargo bed.

6 Claims, 9 Drawing Sheets

(56) References Cited

U.S. PATENT DOCUMENTS

| | | | | |
|---|---|---|---|---|
| 8,322,770 B2 * | 12/2012 | Kosuge | ................ | B60N 2/3018 |
| | | | | 296/183.1 |
| 8,322,772 B1 * | 12/2012 | Gilbeck | ................... | B60N 2/24 |
| | | | | 296/37.15 |
| 8,328,261 B2 * | 12/2012 | Kanazawa | ................ | B60P 1/28 |
| | | | | 296/183.1 |
| 8,348,322 B2 * | 1/2013 | King | ...................... | B60P 3/423 |
| | | | | 296/183.2 |
| 8,585,116 B2 * | 11/2013 | King | ..................... | B62D 33/03 |
| | | | | 296/24.33 |
| 8,672,387 B1 * | 3/2014 | Kaku | ....................... | B60R 7/04 |
| | | | | 296/65.05 |
| 9,242,680 B2 * | 1/2016 | Schwab | ............... | B62D 33/033 |
| 2007/0216195 A1 * | 9/2007 | Furman | .................... | B60P 1/26 |
| | | | | 296/183.1 |
| 2010/0060026 A1 * | 3/2010 | Bowers | ............... | B60N 2/3013 |
| | | | | 296/66 |
| 2013/0193179 A1 * | 8/2013 | Davidson | .................. | A45F 5/00 |
| | | | | 224/585 |
| 2014/0183903 A1 | 7/2014 | Kaku et al. | | |
| 2015/0175113 A1 * | 6/2015 | Takahashi | ............... | B60R 21/13 |
| | | | | 280/756 |

FOREIGN PATENT DOCUMENTS

| | | | | | |
|---|---|---|---|---|---|
| FR | 652362 | A | * | 3/1929 | ......... B60R 11/0205 |
| FR | 2888178 | A1 | * | 1/2007 | ................ B60P 7/14 |
| FR | 2911552 | A1 | * | 7/2008 | ........... A45C 7/0036 |
| FR | 2928591 | A1 | * | 9/2009 | ............. B60R 7/043 |
| GB | 746737 | A | * | 3/1956 | ......... B60H 1/00014 |

\* cited by examiner

UTILITY VEHICLE

BACKGROUND OF THE INVENTION

1. Field of the Invention

The present invention relates to a utility vehicle, more particularly, to a utility vehicle equipped with a dumping-type cargo bed.

2. Description of the Prior Art

In a utility vehicle equipped with a dumping-type cargo bed, the dumping-type cargo bed is disposed behind one or a plurality of seat rows, and a storage box for storing important baggage is provided, for example, inside the dumping-type cargo bed.

In the configuration in which the storage box is provided inside the dumping-type cargo bed, storage capacity of the dumping-type cargo bed is restricted. In addition, since the storage box is exposed to the outside, the storage box itself is required to have a strong structure so as to protect the baggage stored therein, and thereby its cost increases.

US Patent Publication No. 2014-0183903 discloses a utility vehicle having a dumping-type cargo bed. However, the utility vehicle disclosed in the above-mentioned prior art is not equipped with a storage box, and a space between a front panel of the cargo bed and a backrest of a seat is dead space and is not used.

SUMMARY OF THE INVENTION

The present invention has been devised in consideration of the above-mentioned problem, and an object of the present invention is to provide a utility vehicle capable of providing a storage box by effectively using a space between a front panel of a dumping-type cargo bed and a backrest of a seat row or seat rows of the vehicle, without restricting the storage capacity of the dumping-type cargo bed. Another object of the present invention is to provide a utility vehicle capable of protecting the storage box, without the need for separately providing a protection cover or the like for the storage box, and capable of easily opening and closing the space in which the storage box is stored by raising and lowering the cargo bed (by performing a dumping operation).

In order to solve the above-mentioned problem, the utility vehicle according to the present invention includes one or a plurality of seat row(s); a dumping-type cargo bed arranged behind the one or the plurality of seat row(s), the cargo bed being turnable or rotatable around a pivot provided at a rear portion of the vehicle so as to raise a front portion of the cargo bed; and a storage box, part or whole of the storage box disposed in a space between a backrest of the one seat row or a backrest of a last seat row of the plurality of seat rows and a front panel of the dumping type cargo bed.

With the above-mentioned configuration, the space between the seat row and the front panel of the cargo bed can be used effectively to store baggage, and thereby the storage box can be provided without restricting the storage capacity of the cargo bed. In addition, any protection cover for the storage box is not required to be provided separately, and the space for storing the storage box can be opened and closed easily by raising and lowering the cargo bed.

The present invention having the above-mentioned configuration is preferably equipped with the following configurations.

(a) The storage box is fixed to a fixing member provided on the side of the one or the plurality of seat rows.

With the above-mentioned configuration (a), even in a case in which the storage space is desired to be opened and closed by raising and lowering the dumping-type cargo bed, the storage box itself is not moved, whereby the fixing structure of the storage box is stable and the raising and lowering (opening and closing) of the dumping-type cargo bed can be easily performed.

(b) The utility vehicle further includes a plurality of cabin walls enclosing a cabin for accommodating the one or the plurality of seat row(s), and a rear cabin wall member of the cabin walls covers a front side of the storage box.

With the above-mentioned configuration (b), the front side of the storage box can be protected by the rear cabin wall member, and the appearance of the utility vehicle is improved.

(c) The front panel of the dumping-type cargo bed has a screen extending upward.

With the above-mentioned configuration (c), a rear upper portion of the storage box can be protected by the screen, and the appearance of the utility vehicle is improved.

(d) The storage box is fixed to the front panel and/or the screen.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

FIGS. 1 to 4 show a utility vehicle according to the present invention, and on the basis of these drawings, an embodiment of the present invention will be described. For convenience of explanation, an advancing direction of the utility vehicle is explained as the "front" of the utility vehicle and the respective components thereof, and the left-right direction as viewed from the driver or a passenger of the vehicle is explained as the "left-right direction" of the vehicle and the respective components thereof.

Figure 1:
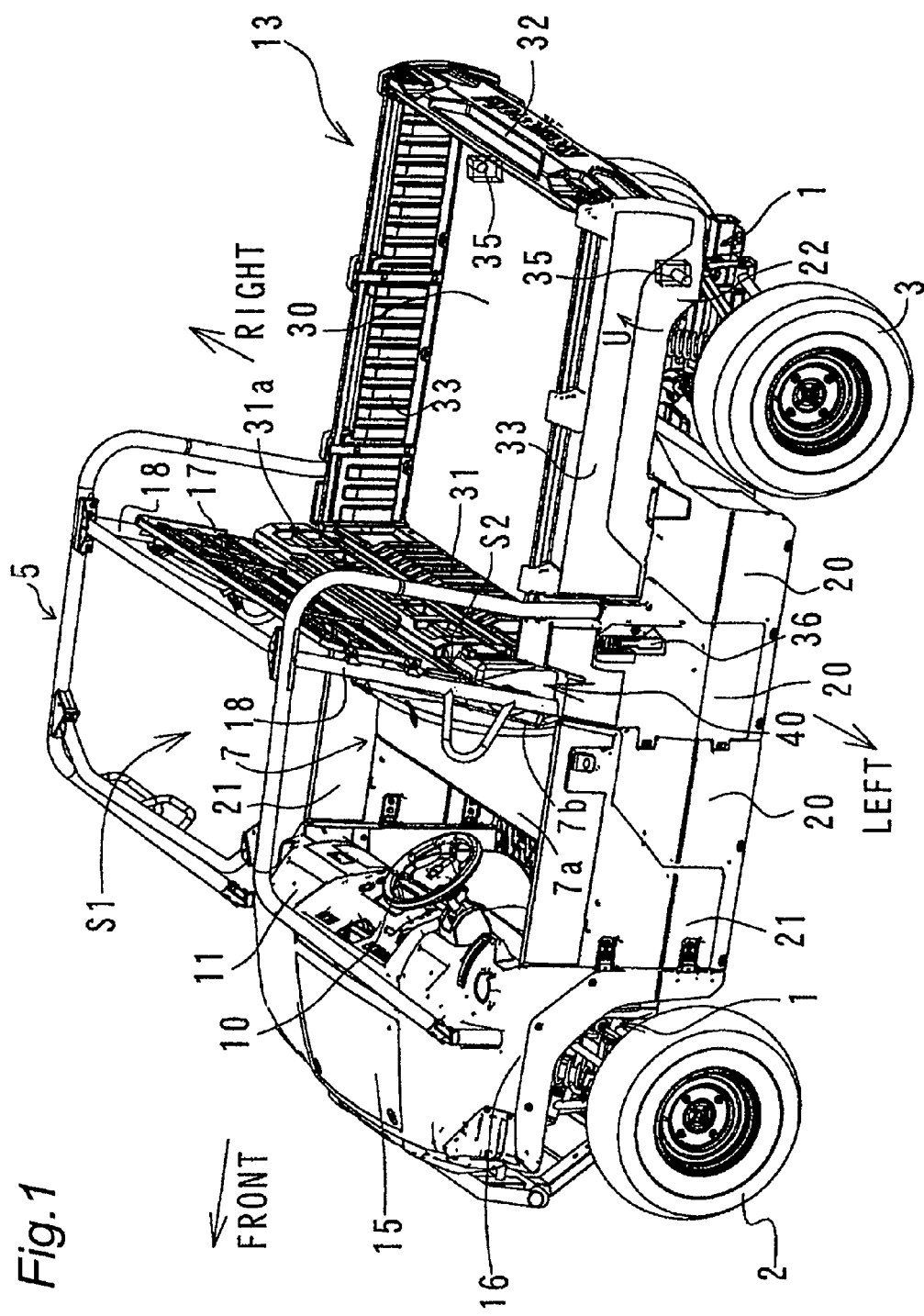
FIG. 1 is a perspective view showing a utility vehicle according to the present invention, viewed from left above.

In FIG. 1, the utility vehicle includes a vehicle frame 1, left and right front wheels 2 disposed at a front end portion of the vehicle frame 1, and left and right rear wheels 3 disposed at a rear end portion of the vehicle frame 1. A riding space (cabin) S1 is positioned between the front wheels 2 and the rear wheels 3 in a front-rear direction, and is enclosed with a rollover protective structure (R.O.P.S.) 5. A bench-type seat 7 is arranged in the riding space S1. A steering wheel 10 and a dash panel 11 are disposed at a front end portion of the riding space S1. The bench-type seat 7 includes a seat plate 7a and a backrest 7b rising from a rear end portion of the seat plate 7a.

The utility vehicle further comprises a dumping-type cargo bed 13 behind the riding space S1, a hood 15 and left and right front fenders 16 in front of the riding space S1, and a grid-like upper screen 17. The grid-like upper screen 17 makes a partition between the riding space S1 and an upper space of the cargo bed 13. The upper screen 17 is disposed above the backrest 7b of the seat 7, and is supported by left and right vertical members 18 in a middle of the R.O.P.S. 5. Left and right side covers 20 and left and right doors 21 are disposed on left and right sides of the riding space S1, and the left and right side covers 20 are extended to left and right rear fenders 22 via lower portions of left and right ends of the cargo bed 13, respectively.

The dumping-type cargo bed 13 includes a bottom plate 30, a front panel 31, a rear panel 32, and left and right side panels 33. A rear end portion of a lower surface of the cargo bed 13 is rotatably or turnably supported by the vehicle frame 1 via left and right pivot shafts 35, and the cargo bed 13 is locked to the vehicle frame 1 by latch devices 36 provided at both left and right ends of the front portion of the cargo bed 13. In other words, when the cargo bed 13 is released from a fixed state to the vehicle frame 1 by releasing the latch devices 36, the cargo bed 13 is rotated or turned around the pivot shafts 35 in a direction indicated by an arrow U, and thereby the position of the cargo bed 13 can be changed between a lowered position (the normal position shown in FIG. 1) and a dump position (inclined position) in which the front end portion of the cargo bed 13 is raised.

A grid-like lower screen 31a protruding upward is formed at an upper end of the front panel 31, and this lower screen 31a and the above-mentioned upper screen 17 constitute a whole screen, thereby forming a partition between the cargo bed 13 and the riding space S1.

A storage box 40 serving as a main portion according to the present invention is made of a hard resin or a metal. The storage box 40 is disposed in a box arrangement space S2 between the backrest 7b of the seat 7 and the front panel 31 of the cargo bed 13 and the lower screen 31a, and is extended over the nearly whole width of the cargo bed 13 in a vehicle width direction.

Figure 2:
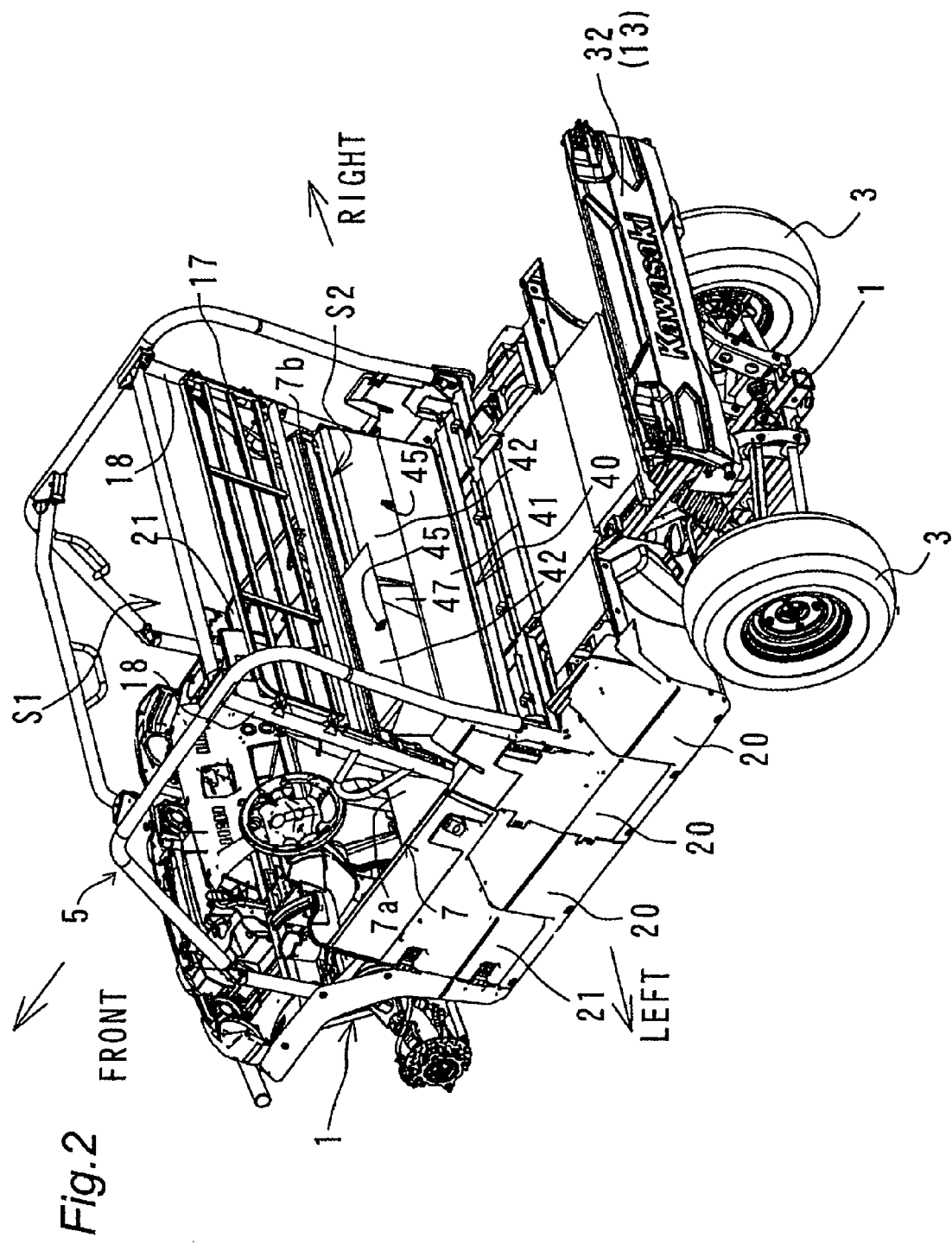
FIG. 2 is a perspective view showing the utility vehicle shown in FIG. 1, with the dumping-type cargo bed thereof being removed.

FIG. 2 is a perspective view showing the utility vehicle, with the cargo bed 13 being removed. The storage box 40 includes a box body 41 having an opening at an upper rear surface thereof, and left and right box lids 42 disposed so as to be able to open and close the opening of the box body 41. An inside space of the box body 41 is divided into left and right chambers by a partition plate 47. The left box lid 42 closes the opening of the left chamber inside the box body 41, and the right box lid 42 closes the right chamber inside the box body 41. The left and right box lids 42 are each provided with a locking knob 45 so as to be locked in a closed state.

Figure 3:
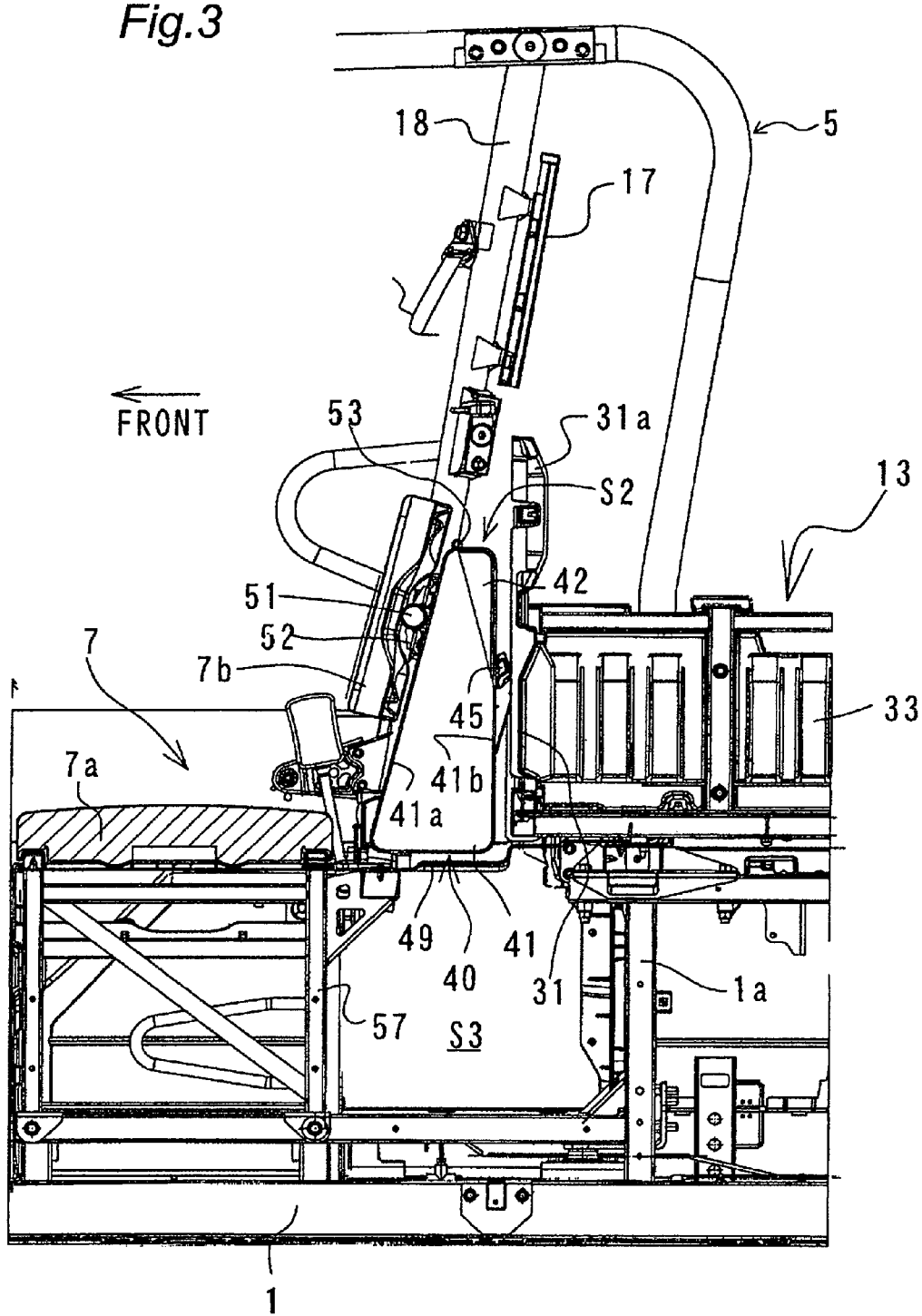
FIG. 3 is an enlarged vertical cross-sectional side view showing the utility vehicle shown in FIG. 1.

In FIG. 3, the storage box 40 is formed into a trapezoidal shape being long in a vertical direction as viewed from the side. A front wall 41a of the storage box 40 is formed so as to be inclined upward and rearward and is made in parallel with a rear surface of the backrest 7b. A rear wall 41b of the storage box 40 is extended nearly vertically upward in parallel with the front panel 31 of the cargo bed 13.

An upper end portion of each box lid 42 is supported on a front upper end of the box body 41 via a hinge 53, and the locking knob 45 is provided at a rear lower end of each box lid 42. A partition plate 49 being nearly horizontal is disposed below the storage box 40. This partition plate 49 forms a partition between the box arrangement space S2 positioned on an upper side and a space S3 positioned on a lower side. The space S3 positioned on the lower side communicates with an engine compartment (not shown) disposed on a rear side. A front end portion of the partition plate 49 is fixed to upper ends of a plurality of supporting legs 57 of the seat 7, and a rear end portion of the partition plate 49 is fixed to an upper end of a cargo bed supporting frame 1a for supporting the cargo bed 13 located at the lowered position.

Figure 4:
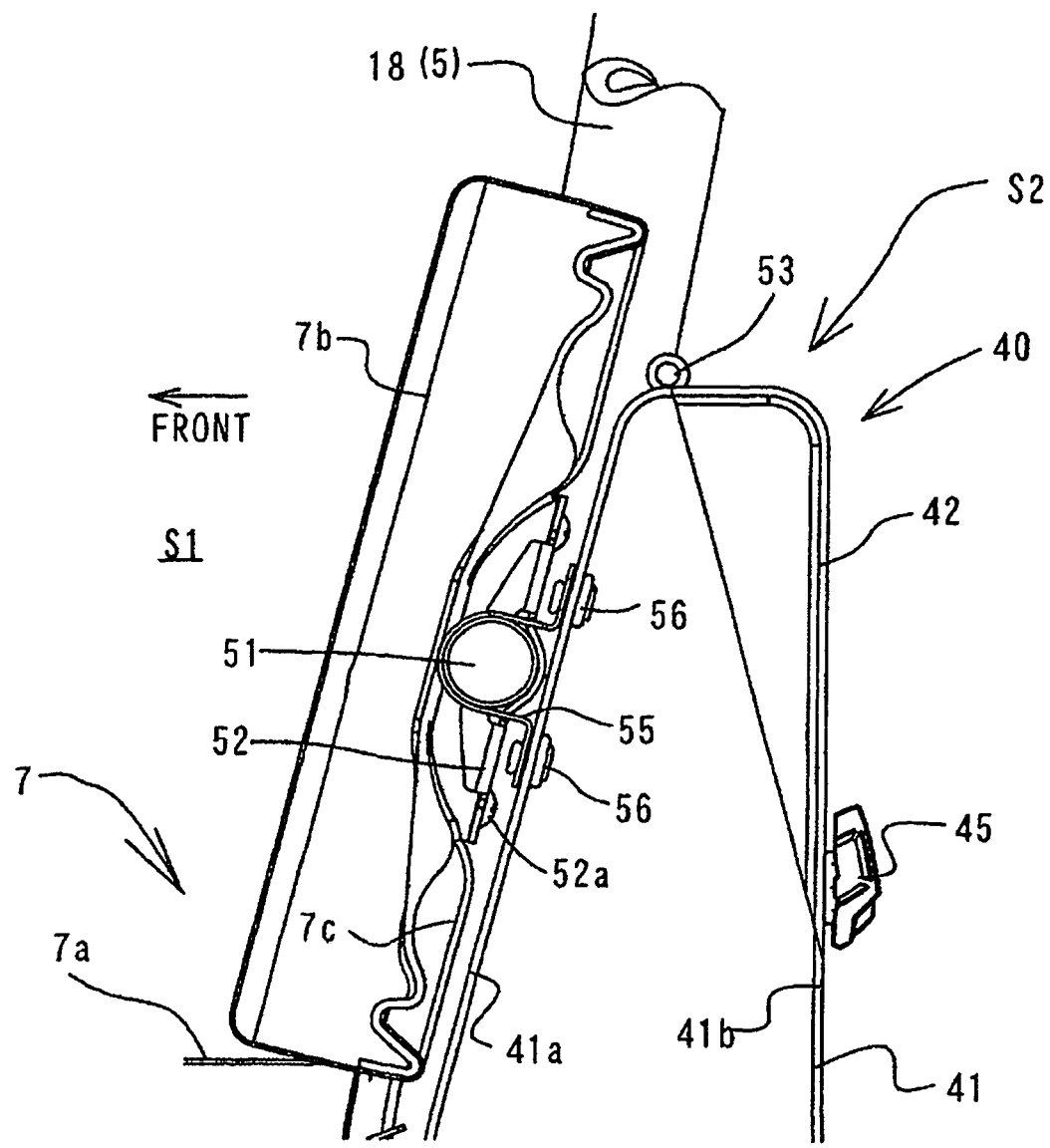
FIG. 4 is an enlarged cross-sectional view showing the main portions shown in FIG. 3.

In FIG. 4, a base plate 7c of the backrest 7b is fixed to a cross pipe 51 of the R.O.P.S. 5 by means of a plurality of mounting plates 52 and a plurality of screws 52a. The cross pipe 51 connects the left and right intermediate vertical members 18 of the R.O.P.S. 5. The front wall 41a of the storage box 40 is attached to the cross pipe 51 by means of a plurality of U-shaped brackets 55 and a plurality of push rivets 56. A slidable pin is inserted into a body of the push rivet 56 and the pin is pushed into the body of the rivet, whereby a tip end portion of the rivet 56 is expanded, and two members to be connected are fastened by an expanded portion and a head portion of the rivet.

Various kinds of baggage required to be protected from rain, mud, dust, etc. can be stored inside the storage box 40 shown in FIG. 1. When baggage is to be stored inside the storage box 40, the worker operates the left and right latch devices 36 to release a locked state of the cargo bed 13 and then rotates the cargo bed 13 around the pivot shafts 35 in a direction indicated by the arrow U by using a gas damper or the like to raise the front end portion of the cargo bed 13. As a result, the rear surface of the storage box 40 is exposed so as to be accessible from outside as shown in FIG. 2.

In a state in which the rear surface of the storage box 40 is exposed rearward, the worker releases the locking knob 45 of the box lid 42 desired to be opened and opens the box lid 42 desired to be opened and then stores baggage.

After storing baggage in the storage box 40, the worker closes the box lid 42, returns the cargo bed 13 from the raised position to the lowered position (the normal position) and locks the cargo bed 13 at the lowered position with the latch devices 36.

In the state in which the cargo bed 13 is locked in the lowered position, the box lids 42 are covered from behind with the front panel 31 of the cargo bed 13, and the locking knobs 45 of the box lids 42 become inaccessible from behind. In other words, in the state in which the cargo bed 13 is positioned at the lowered position, the front portion of the storage box 40 is covered with the backrest 7b, the rear portion of the storage box 40 is covered with the front panel 31 of the cargo bed 13, the left and right side surfaces of the storage box 40 are covered with the left and right side covers 20 of the vehicle body, and the lower portion of the storage box 40 is covered with the partition plate 49. Hence, the major portions of the storage box 40, other than the upper surface, are covered with the backrest 7b, the front panel 31, the side covers 20 and the partition plate 49, and are thereby protected from the outside.

In the case of taking out baggage from the inside of the storage box 40, the worker reverses the procedure of the above-mentioned storage work.

Advantage of the Embodiment (1) Since the storage box 40 is disposed in the space S2 between the backrest 7b of the seat 7 and the front panel 31 of the cargo bed 13, the above-mentioned space S2, which conventionally serves as a dead space, can be used effectively to store baggage, and the storage capacity of the cargo bed 13 is not reduced.

(2) Since the major portions of the storage box 40, other than the upper surface, are covered with the backrest 7b, the front panel 31 of the cargo bed 13 and the left and right side covers 20, the storage box 40 can be protected from the outside without the need for separately providing a protection cover for the box.

(3) Since the state of the access to the storage box 40 can be changed easily by raising and lowering (rotating) the dumping-type cargo bed 13, the baggage can be easily stored in the storage box 40 and taken out therefrom.

(4) The storage box 40 is fixed to the cross pipe (fixing member) 51 to which the backrest 7b of the seat 7 is fixed, together with the backrest 7b. Therefore, even when the box arrangement space S2 is opened and closed by raising and lowering the dumping-type cargo bed 13, the storage box 40 is not raised or lowered. And thereby the fixed structure of the storage box 40 becomes stable. Since the storage box 40 is not raised or lowered, the raising/lowering operation of the dumping-type cargo bed 13 does not become heavy as a matter of course.

(5) Since the front panel 31 of the dumping-type cargo bed 13 lids the lower screen 31a extending upward, the rear upper portion of the storage box 40 can be protected by the lower screen 31a. In addition, the appearance of the utility vehicle is improved.

Figure 5:
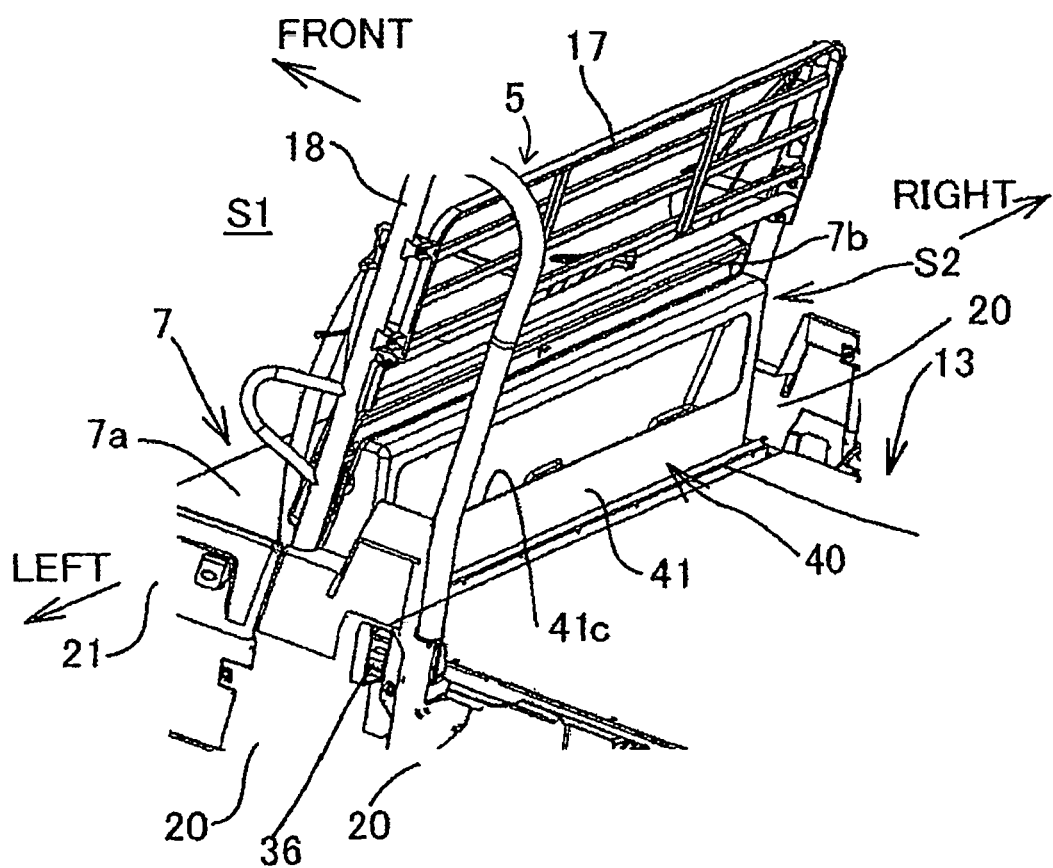
FIG. 5 is a perspective view showing a first modification according to the present invention.

Other Embodiments (1) FIG. 5 shows a first modification of the storage box 40, and the storage box 40 has only the box body 41 having an opening 41c but has no box lid. The opening 41c of the box body 41 is covered with the front panel 31 of the cargo bed 13 located at the lowered position (the normal position). With the first modification, the number of components of the storage box 40 is reduced.

Figure 6:
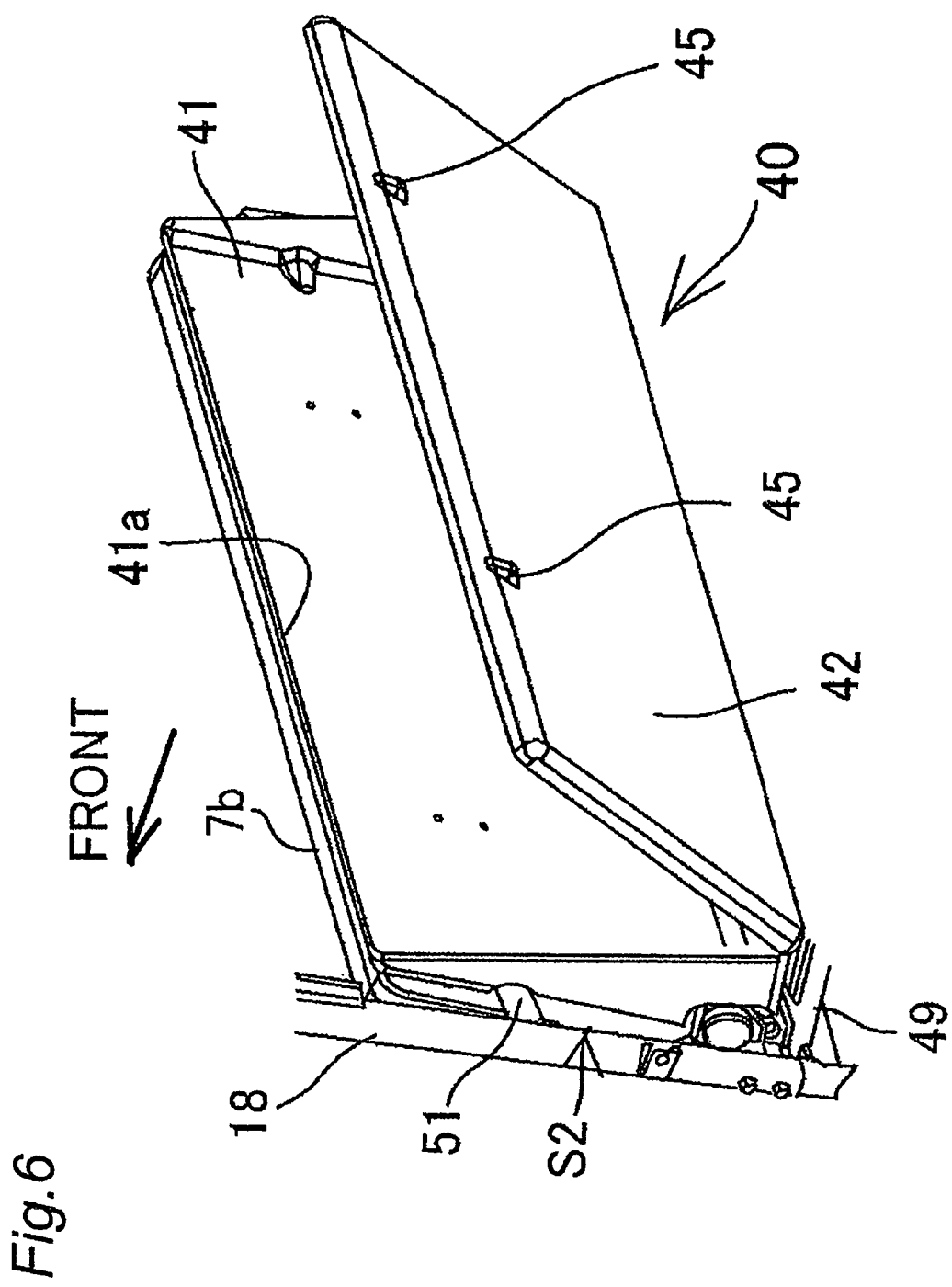
FIG. 6 is a perspective view showing a second modification according to the present invention.

(2) FIG. 6 shows a second modification of the storage box 40 in which the whole rear surface of the box body 41 can be opened and a single box lid 42 covers the entire opening. A lower end of the box lid 42 is rotatably supported on the box body 41 via hinges, and an upper end thereof is provided with left and right locking knobs 45.

Figure 7:
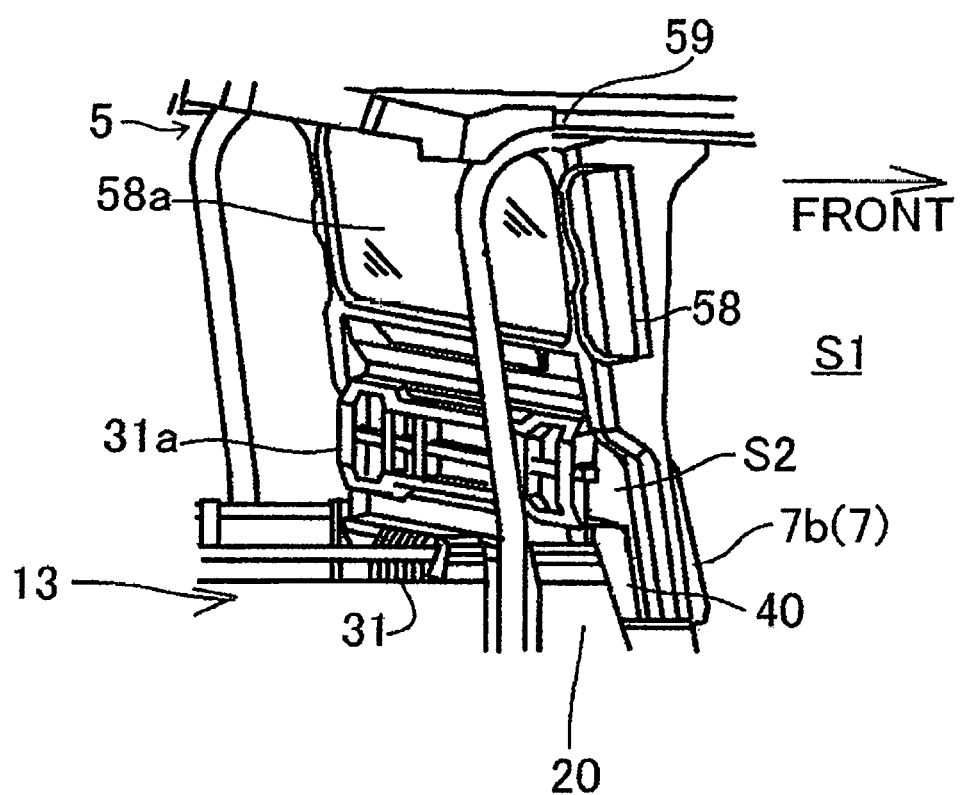
FIG. 7 is a perspective view showing a third modification according to the present invention.

FIG. 7 shows a third modification of the present invention. This modification is an example obtained by applying the present invention to a utility vehicle in which the riding space (cabin) S1 is surrounded by a plurality of cabin walls. However, as the cabin walls, FIG. 7 shows a rear cabin wall portion 58, and a ceiling portion 59. The rear cabin wall portion 58 is provided with a window 58a made of transparent glass or resin.

The rear cabin wall portion 58 covering the rear portion of the riding space (cabin) S1 is disposed behind the backrest 7b of the seat 7, and the storage box 40 is disposed in the space S2 between a rear surface (outer surface) of the rear cabin wall portion 58 and the front panel 31.

Figure 8:
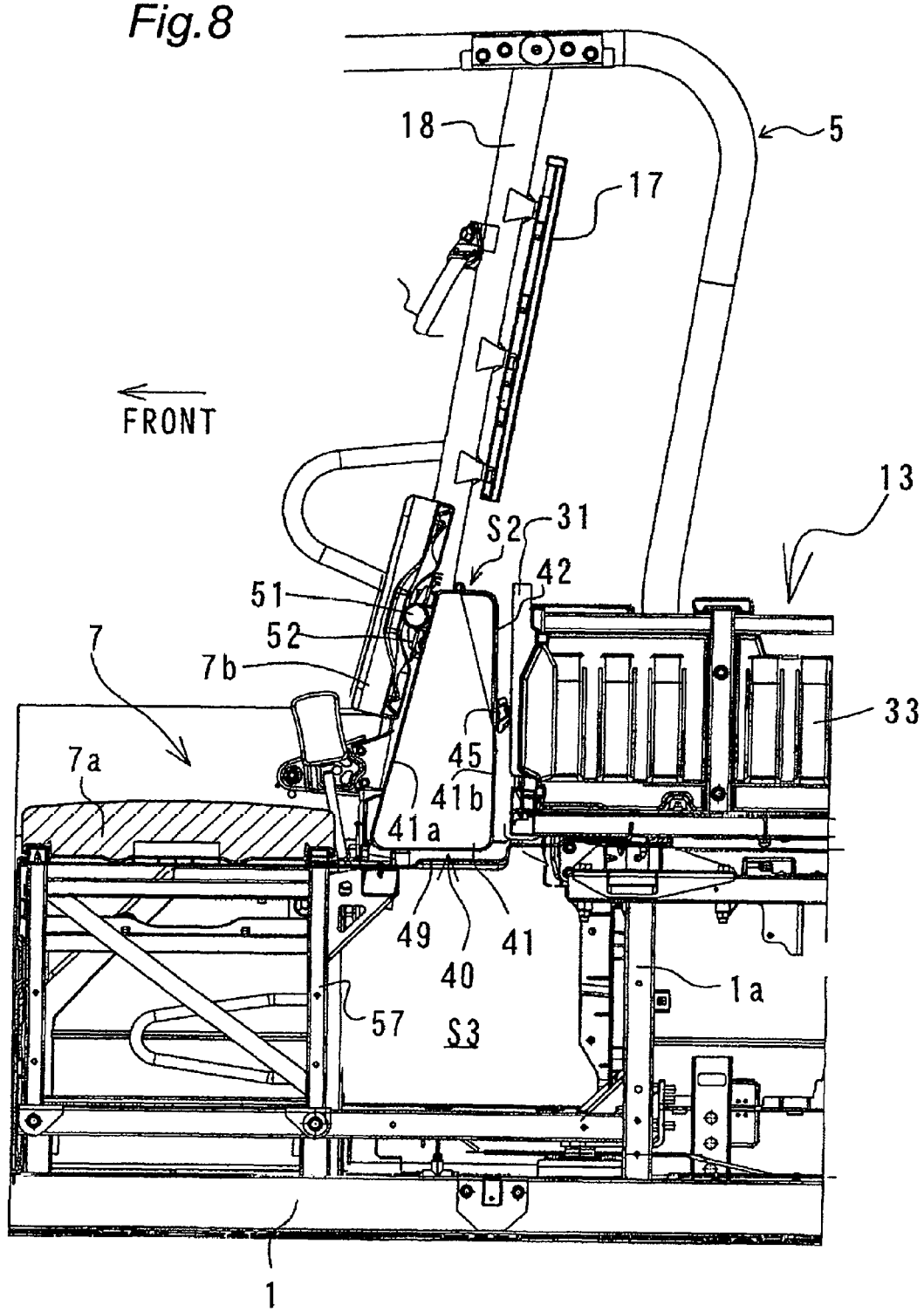
FIG. 8 is a perspective view showing a fourth modification according to the present invention.

(4) FIG. 8 shows a fourth modification of the present invention in which the front panel 31 of the cargo bed 13 has no lower screen. Instead of the lower screen, the upper screen 17 provided on the R.O.P.S. 5 is extended downward close to the upper end of the backrest 7b. The box arrangement space S2 is formed between the backrest 7b of the seat 7 and the front panel 31 of the cargo bed 13, and the whole of the storage box 40 is stored inside the box arrangement space S2.

Figure 9:
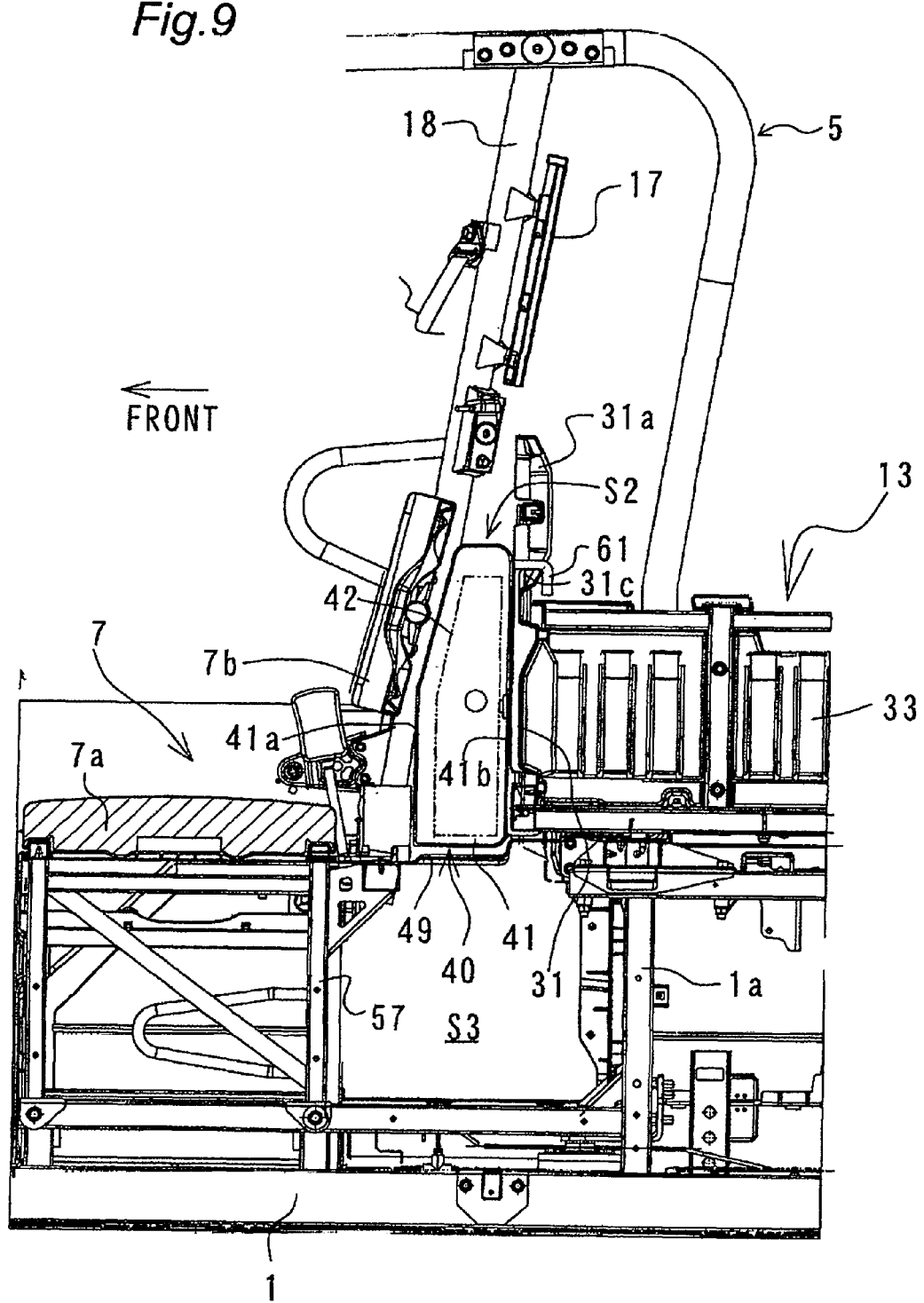
FIG. 9 is a perspective view showing a fifth modification according to the present invention.

FIG. 9 shows a fifth modification of the present invention in which the storage box 40 disposed in the box arrangement space S2 is fixed to the front panel 31 of the cargo bed 13 and the lower screen 31a. The other structures are the same as those of the embodiment shown in FIGS. 1 to 4. A hook 61 is formed at the upper portion of the rear wall 41b of the storage box 40, and the hook 61 is engaged with the horizontal bar portion 31c of the lower screen 31a. Furthermore, the intermediate portion of the rear wall 41b in the vertical direction thereof is fixed to the front panel 31 with fasteners, such as bolts or push rivets. The box lid 42 is provided on an end wall of the storage box 40 in the vehicle width direction so that the baggage can be easily put into and taken out from the side of the vehicle. Furthermore, the front wall 41a of the storage box 40 is opposed to the backrest 7b with an appropriate distance being provided thereto so as not to make contact with the backrest 7b while the cargo bed 13 is raised and lowered. Instead of the above-mentioned fixing method, a method of fixing the storage box 40 only to the front panel 31 by using appropriate fastening means may also be used, or a method of fixing the storage box 40 only to the lower screen 31a by using appropriate fastening means may also be used.

Although the storage box made of a hard resin or a metal is provided in the above-mentioned respective embodiments, the storage box 40 may be made of cloth or soft resin having flexibility. In this case, the storage box having flexibility can be suspended from the screen 17 by using a plurality of hooks or the like. Moreover, a storage box made of a net can also be provided.

(7) The storage box may be configured so as to be simply placed on the upper surface of the partition plate 49 as shown in FIG. 3, instead of being fixed to the vehicle body frame.

(8) A plurality of storage boxes may be disposed in the space between the backrest of the seat and the front panel of the cargo bed.

(9) The present invention is also applicable to a utility vehicle equipped with a front seat row and a rear seat row. In this cane, the storage box is disposed in the space between the backrest of the rear seat row and the front panel of the cargo bed.

(10) The present invention is not limited to the structures of the above-mentioned embodiments, but includes various modifications that can be devised without departing from the contents described in the appended claims.

What is claimed is:

1. A utility vehicle comprising:
   at least one seat row;
   a dumping-type cargo bed arranged behind the at least one seat row, the cargo bed being turnable or rotatable around a pivot provided at a rear portion of the vehicle so as to raise a front portion of the cargo bed; and
   a storage box, part or whole of the storage box disposed in a space between a backrest of the at least one seat row and a front panel of the dumping-type cargo bed,
   wherein an upper end of the storage box is located above an upper end of the front panel and the storage box extends over nearly the entire width of the cargo bed in a vehicle width direction.

2. The utility vehicle according to claim 1, wherein the storage box is fixed to a fixing member provided on a side of the at least one seat row.

3. The utility vehicle according to claim 1, further comprising:

cabin walls enclosing a cabin for accommodating the at least one seat row, wherein a rear cabin wall member of the cabin walls covers a front side of the storage box.

4. The utility vehicle according to claim 1, wherein the front panel of the dumping-type cargo bed has a screen extending upward.

5. A utility vehicle comprising:
at least one seat row;
a dumping-type cargo bed arranged behind the at least one seat row, the cargo bed being turnable or rotatable around a pivot provided at a rear portion of the vehicle so as to raise a front portion of the cargo bed; and
a storage box, part or whole of the storage box disposed in a space between a backrest of the at least one seat row and a front panel of the dumping-type cargo bed, wherein the storage box is fixed to the front panel.

6. A utility vehicle comprising:
at least one seat row;
a dumping-type cargo bed arranged behind the at least one seat row, the cargo bed being turnable or rotatable around a pivot provided at a rear portion of the vehicle so as to raise a front portion of the cargo bed; and
a storage box, part or whole of the storage box disposed in a space between a backrest of the at least one seat row and a front panel of the dumping-type cargo bed,
wherein the front panel of the dumping-type cargo bed has a screen that extends upward, and
wherein the storage box is fixed to the screen.

* * * * *